United States Patent [19]

Yatsiv et al.

[11] Patent Number: 4,847,852
[45] Date of Patent: Jul. 11, 1989

[54] ULTRA COMPACT, RF EXCITED GASEOUS LASERS

[75] Inventors: Shaul Yatsiv, Jerusalem; Amnon Gabay, Mevassereth Zion; Mordechai Brestel, Rehovot; Judd Blass, deceased, late of Herzlia Pituach, all of Israel, by Lorell Blass, legal representative

[73] Assignees: Alumor Lasers Ltd.; Yissum-Research Development Company of the Hebrew University of Jerusalem, both of Jerusalem, Israel

[21] Appl. No.: 135,384

[22] Filed: Dec. 21, 1987

[30] Foreign Application Priority Data

Jan. 30, 1987 [IL] Israel .................................... 81439

[51] Int. Cl.$^4$ ............................................ H01S 3/097
[52] U.S. Cl. ......................................... 372/82; 372/35; 372/87; 372/88
[58] Field of Search ................... 372/35, 81, 82, 83, 372/87, 88

[56] References Cited

U.S. PATENT DOCUMENTS

3,748,594  4/1973  Pugh .................................. 331/94.5
4,611,329  9/1986  Ernst et al. ............................ 372/88

FOREIGN PATENT DOCUMENTS

8611727  8/1986  Fed. Rep. of Germany .
3536770  4/1987  Fed. Rep. of Germany .

OTHER PUBLICATIONS

Sinclair and Tulip, Parameters affecting the performance of a RF excited $CO_2$ waveguide laser. J. App. Phys. 56(9), Nov. 1984.

Kolesnikov et al., Electric discharge chamber for coaxial $CO_2$ lasers. Sov. J. Quantum Electron. 14(5), May 1984.

Crocker and Wills, Carbon-Dioxide laser with high power per unit length. Electronics Letters vol. 5(4) Feb. 1969.

Xin and Hall, Multipass coaxial RF discharge $CO_2$ laser, Optics Communications vol. 58 (6), Jul. 1986.

AD Reg. 1976 U.S. NTIS Document AD-A030724, A 15 Kilowalt CN $CO_2$ coaxial Electric Discharge Laser.

Intermediate-pressure electrodeless Discharges in rf & pulsed fields, Yu. P. Raizer, Sov. J. Plasma Phys. 5(2), Mar.-Apr. 1979 (English Version), American Institute of Physics, pp. 232-237.

Plasma Chemistry of RF discharge in $CO_2$ laser gas mixtures, G. C. R. Williams et al., J. Phys. D. Appl. Phys., vol. 18, 1985, 335-346.

Influence of xenon on sealed-off operation of rf-excited $CO_2$ waveguide lasers, D. He et al., J. Appl. Physics, vol. 56(3),.Aug. 1984.

Temp. Rise & Radial Profiles in $CO_2$ lasers, A. J. Landerman et al., J. Appl. Physics, vol. 42, No. 8, Jul. 1971, pp. 3138-3144.

Off-Axis Paths in Spherical Mirror Interferometers, D. Herroitt et al., Appl. Optics, vol. 3, No. 4, Apr. 1964, pp. 523-526.

*Primary Examiner*—William L. Sikes
*Assistant Examiner*—B. Randolph Holloway
*Attorney, Agent, or Firm*—Shapiro and Shapiro

[57] ABSTRACT

A laser comprising an RF matching unit having an RF power input and an RF power output, an optical cavity including electrode apparatus extending along the optical cavity, receiving the RF power output and defining a discharge gap having a gaseous lasing medium disposed therein, the RF power output being operative to produce a population inversion in the gaseous lasing medium, and an arrangement for providing direct fluid cooling contact with the electrode apparatus generally along its entire extent.

22 Claims, 10 Drawing Sheets

4,847,852

ULTRA COMPACT, RF EXCITED GASEOUS LASERS

FIELD OF THE INVENTION

The present invention relates to lasers generally and more particularly to RF excited molecular gaseous lasers.

BACKGROUND OF THE INVENTION

A great variety of lasers is presently known. The following summary includes those lasers most relevant to the laser of the present invention.

An RF matched $CO_2$ waveguide laser is described in an article entitled "Parameters affecting the performance of a rf excited $CO_2$ waveguide laser" in J. Appl. Phys. Vol. 56(9) 1 Nov., 1984 at pages 2497–2501.

Annular AC excited $CO_2$ lasers are described in an article entitled "Electric discharge chamber for coaxial $CO_2$ lasers" in Sov. J. Quantum Electron. (English Version) American Institute of Physics, Vol 14(5), May, 1984, pp. 647–649. An annular RF laser employing a DC field is described in an article entitled "Carbon-Dioxide Laser With High Power per Unit Length" in Electronics Letters Vol 5(4), Feb. 20, 1969, pages 63 and 64.

U.S. Pat. No. 3,748,594 describes a radio frequency electrically excited flowing gas laser wherein the discharge circuit is capacitively ballasted by providing capacitive impedance between the electrode and the gas. An RF excited annular laser having a relatively large gap is described in an article entitled: "Multipass Coaxial Radio Frequency Discharge $CO_2$ Laser" in Optics Communications Vol. 58(6) 15 July, 1986, pages 420–422.

A 15 KW coaxial electrical discharge laser is mentioned in an abstract of AD Rep. 1976 U.S. NTIS Document AD-A030724.

SUMMARY OF THE INVENTION

The present invention seeks to provide a highly compact gas laser having performance features which are not available in the prior art for lasers of comparable power.

There is thus provided in accordance with a preferred embodiment of the present invention, a laser comprising an RF matching unit having an RF power input and an RF power output, an optical cavity including electrode apparatus extending along the optical cavity, receiving the RF power output and defining a discharge gap having a gaseous lasing medium disposed therein, the RF power output being operative to produce a population inversion in the gaseous lasing medium, and means for providing direct fluid cooling contact with the electrode apparatus generally along its entire extent.

Further in accordance with a preferred embodiment of the present invention, the electrode apparatus comprises coaxial inner and outer electrodes separated by the discharge gap.

Additionally in accordance with the above preferred embodiment of the present invention having coaxial inner and outer electrodes, the discharge gap is less than 5 mm.

Further in accordance with the above preferred embodiment of the present invention having coaxial inner and outer electrodes, these electrodes may be arranged axially along the same axis as a coaxial transmission line forming part of the RF matching unit.

Additionally in accordance with this preferred embodiment of the invention, the inner and outer electrodes are integrally formed or fixedly joined together with corresponding elements of the coaxial line to define an integral mechanical and electrical element.

In accordance with this preferred embodiment of the invention, an axial conduit for cooling fluid is provided extending through an aperture formed in optical elements defining at least one of the axial ends of the optical cavity.

Further in accordance with a preferred embodiment of the invention, the optical elements define an optical resonator.

Additionally in accordance with a preferred embodiment of the present invention, the conduit for cooling fluid is generally axial extending in a straight line through the laser.

Further in accordance with an embodiment of the invention, the inner conduit for cooling fluid also comprises an external portion receiving fluid from the conduit and extending coaxially with respect thereto in the opposite direction along the inside of the inner electrode.

Additionally in accordance with an embodiment of the present invention there is provided an external conduit for cooling fluid which provides a coaxial flow of fluid external of the external electrode.

Additionally in accordance with an embodiment of the invention, the laser system includes optical elements disposed at opposite ends of the optical cavity, defining an optical resonator. In one embodiment, the optical elements comprise a partially reflecting front mirror operative as an output coupler and a full reflecting rear mirror.

According to an alternative embodiment, the optical elements comprise first and second full reflectors, at least one of which includes infrared input and output window means, whereby the laser system provides infrared amplification. In this embodiment an external oscillator is normally employed. Alternatively, this oscillator may be defined integrally with the laser system.

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1:
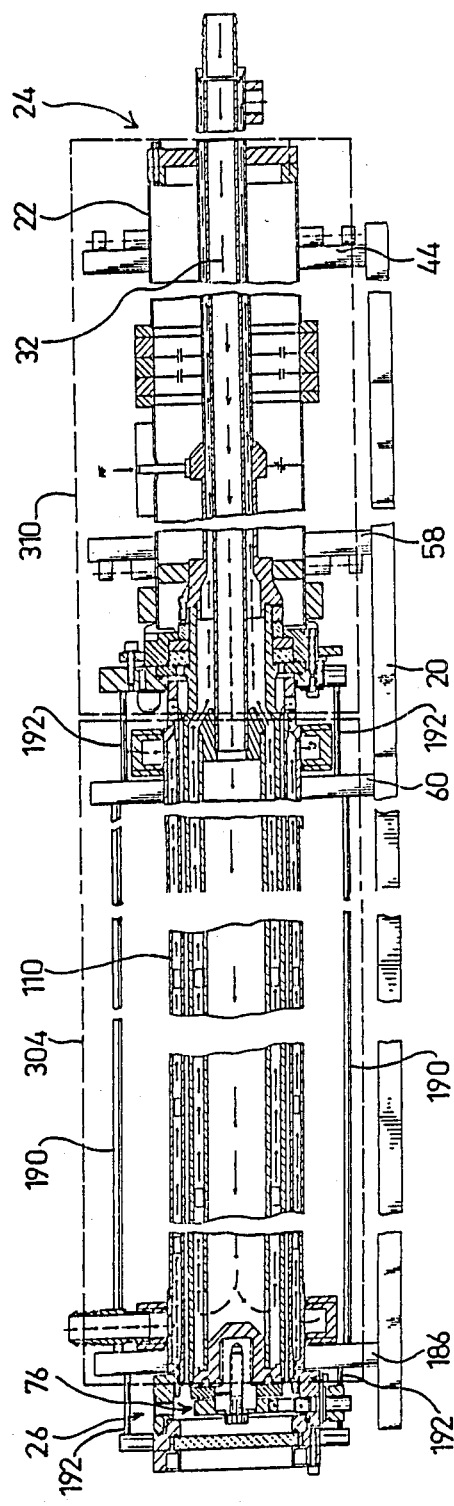
FIG. 1 is a general side view sectional illustration of a laser constructed and operative in accordance with a preferred embodiment of the present invention.

Reference is now made to FIGS. 1-10, which illustrate a laser constructed and operative in accordance with a preferred embodiment of the present invention. In FIG. 1, reference number 304 designates a discharge cavity of the laser, and reference number 310 designates an RF impedance matching unit through which RF power is input to the discharge cavity as will be explained later. Reference number 20 designates a base which may be placed on a suitable support or attached, as desired to other apparatus.

Base 20 supports first and second outer housing elements 22 and 110 which together extend generally along the entire length of the laser from rear end 24 which receives a supply of cooling fluid to a front end 26 from which laser radiation is emitted.

For ease in explanation and understanding, the laser will be described structurally from the rear end 24 forward. The apparatus shown in FIG. 1, with the exception of the base 20, will be termed a "laser head".

Figure 2:
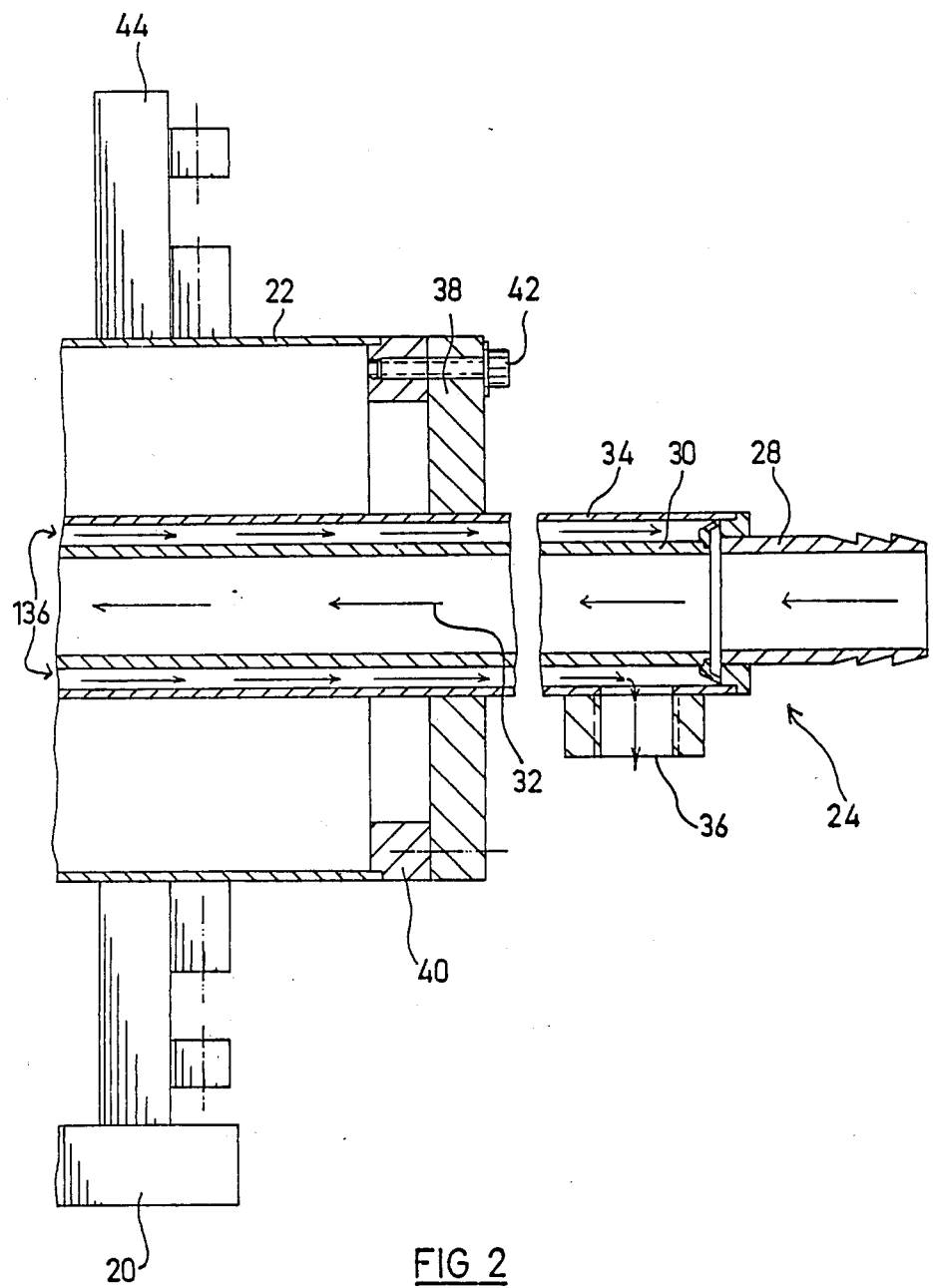
FIG. 2 is a scale side view sectional illustration of a portion of the laser of FIG. 1 including cooling liquid ports.

Rear end 24 is illustrated specifically in FIG. 2 and is seen to include a fluid coupling end 28, which communicates with an axial fluid conduit 30, which extends nearly halfway along the entire length of the laser head about an axis 32. Surrounding conduit 30 in coaxial relationship therewith is a fluid coolant conduit 34 which terminates in an outlet 36.

Figure 7:
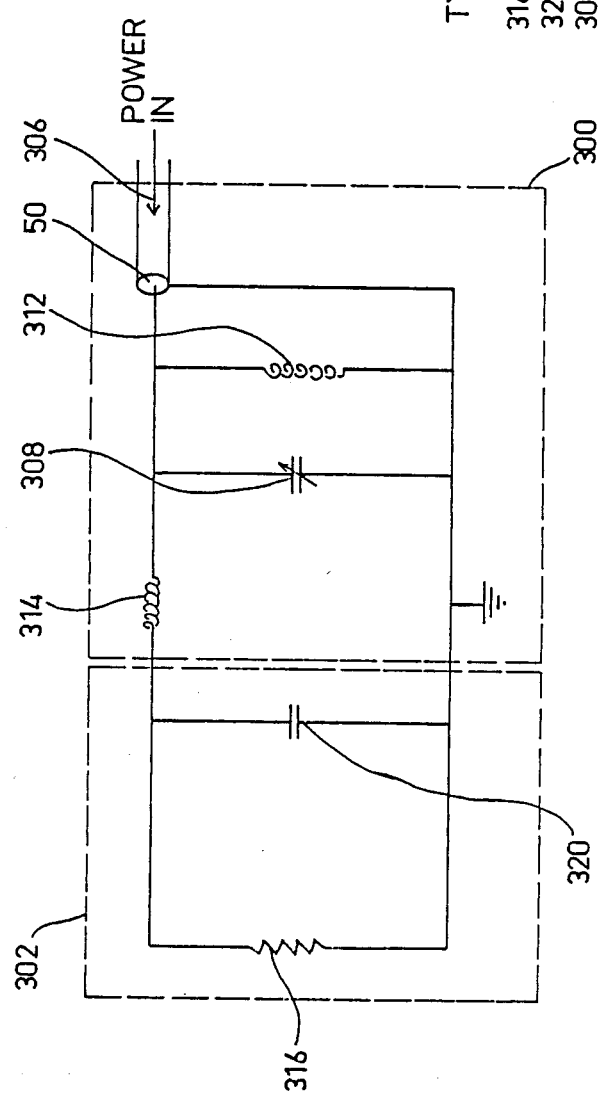
FIG. 7 is an electrical equivalent circuit diagram illustrating RF matching circuit and laser head.

Outer housing 22 terminates adjacent end 24 at an end member 38 which is typically coupled onto a flange 40 associated with the outer housing 22 by means of fasteners 42. End member 38 provides rigid mechanical coupling between outer housing 22 and conduit 34 and also serves an important electrical function which will be described hereinafter. For example, the electrical connection between outer housing 22 and conduit 34 via end member 38 provides an inductance which is part of inductance 312 (FIG. 7).

A plate member 44 serves to connect outer housing 22 adjacent end 24 to the base 20.

Figure 3:
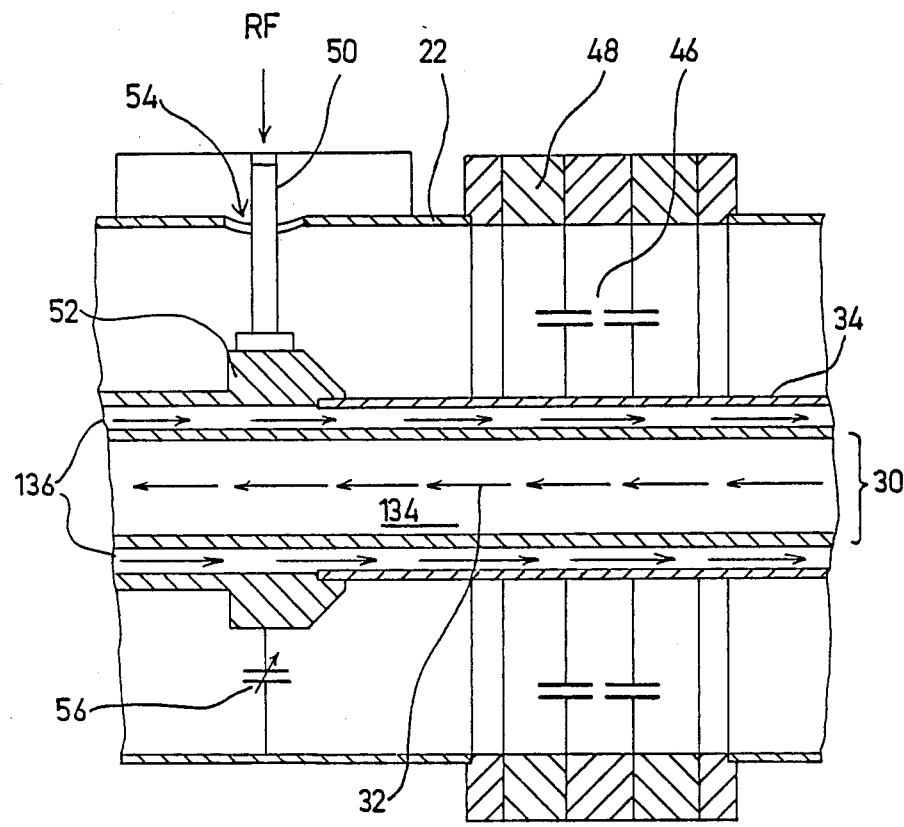
FIG. 3 is a scale side view sectional illustration of a portion of the laser of FIG. 1 including a portion of the RF matching unit and the RF input port.

Turning now to FIG. 3, it is seen that an arrangement of capacitors 46 is connected electrically between support flanges 48 coupled to housing 22 and the cooling conduit 34. It is appreciated that outer housing 22, conduit 34 and flanges 48 are all RF electrical conductors and are typically formed of metal.

A high power RF input port 50, such as an LC connector manufactured by Amphenol of Lisle, Ill., U.S.A. or an E.I.A. connector manufactured by Andrew of Orland Park, Ill., U.S.A., is coupled to cooling conduit 34 via an RF input coupling 52, which surrounds conduit 34 and extends through an aperture 54 formed in outer housing 22. A variable capacitance 56 is electrically connected between the input coupling 52 and the outer housing 22.

Figure 4:
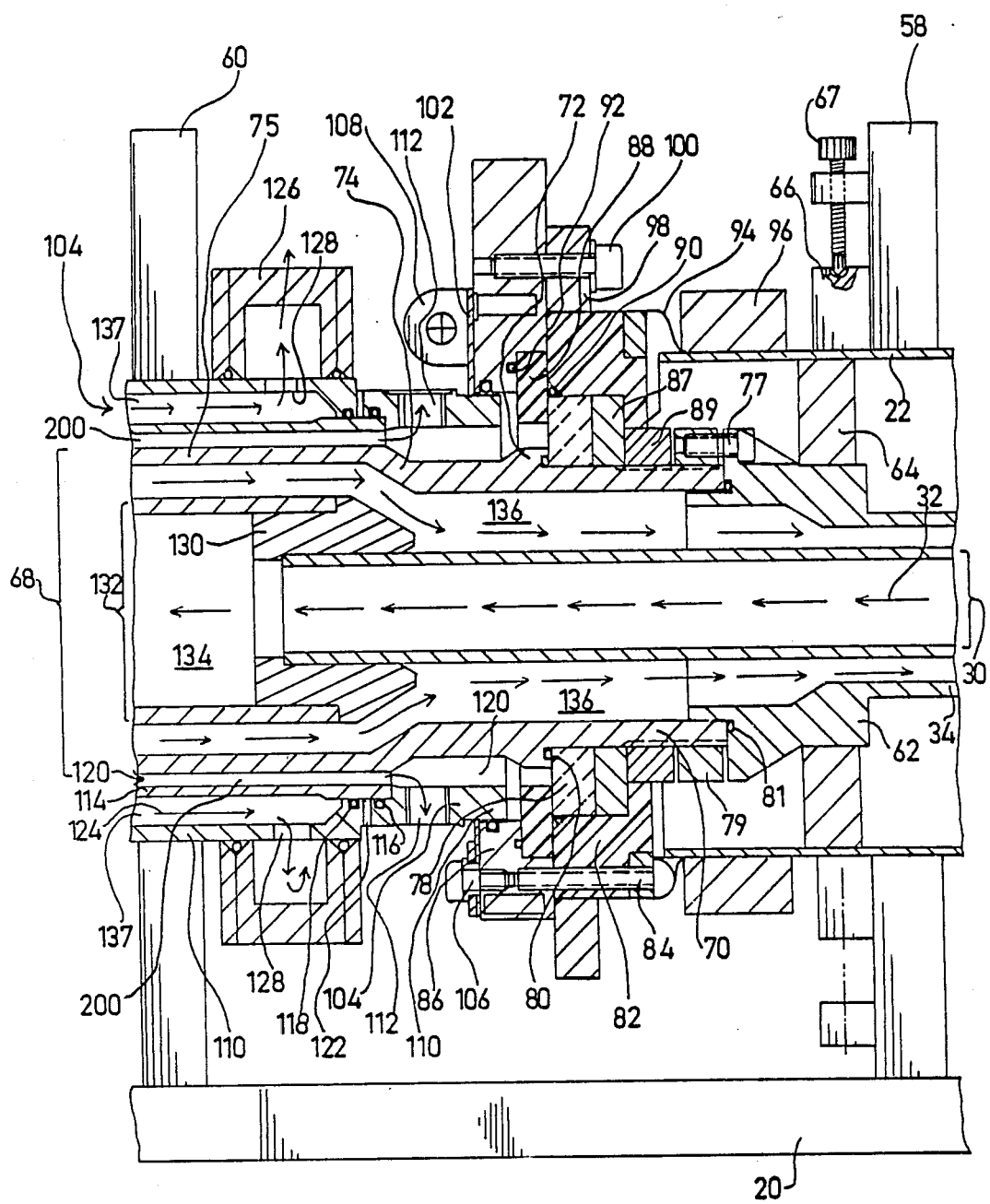
FIG. 4 is a scale side view sectional illustration of a portion of the laser of FIG. 1 including the junction between the RF matching unit and the optical cavity and one end of the optical resonator.

Turning now to FIG. 4, it is seen that additional support plate members 58 and 60, each having a support function similar to that of plate member 44, are provided. These support plate members also have additional important functions which will be described hereinbelow.

It is seen that conduit 34 terminates in a flange 62. According to a preferred embodiment of the invention, flange 62, and thus conduit 34 is precisely centered within outer housing 22 by means of a surrounding ring 64, formed as an RF transparent insulator. Ring 64 is, in turn, supported by plate member 58 via an external support flange 66 and screws 67.

Supported by flange 62 in precisely centered relationship with respect to outer housing 22 and conduit 30 is an inner electrode assembly 68, which extends from flange 62 nearly to the forward end 26 of the laser head (FIG. 1).

Inner electrode assembly 68 defines a first generally cylindrical portion 70 adjacent flange 62 and then defines an annular mirror support surface 72. Beyond surface 72 towards end 26 (FIG. 1), the outer envelope of the inner electrode assembly 68 is expanded radially outwardly at a location generally indicated by reference numeral 74 and then continues in a cylindrical configuration indicated by reference numeral 75 having a precise constant outer diameter until it reaches an end sealing and centering member 76 adjacent end 26 (FIG. 1).

Sealing engagement between flange 62 and generally cylindrical portion 70 is provided by means of a plurality of screws 77 which engage both flange 62 and a flange 79, which is threadably mounted onto cylindrical portion 70. An O-ring 81 provides sealing between flange 62 and portion 70, thereby preventing cooling fluid from leaking to the atmosphere.

An annular mirror 78, typically formed of silicon or metal and coated so as to provide maximum reflection, is mounted onto inner electrode assembly 68 against support surface 72. A spacer 87 is disposed adjacent mirror 78, and a spacer 89 is threaded onto cylindrical portion 70 and is employed for providing a desired press-fit engagement between spacer 87 and mirror 78. This press-fit engagement provides sealing between mirror 78 and annular mirror support surface 72 via an O-ring 80.

Annular mirror 78 is secured in position onto an outer electrode assembly 104 which is described hereinbelow by means of an insulating flange 82, which is secured, as by a bolt 84 onto a fluid cooled mirror housing assembly 86. Interposed between housing assembly 86 and mirror 78 is a precisely configured positioning insulator 88 or annular configuration, typically formed of Zerodur, manufactured by Schott of Germany. Sealing O-rings 90 and 92 are provided on opposite sides of insulator 88.

Outer housing 22 services as a mechanical housing and an electromagnetic shield. Additionally and importantly, outer housing 22 serves as part of the electrical power conduit coupled to RF input 50 (FIG. 3). More particularly, as will be apparent, the shielding housing element 22 and the cooling conduit 34, which is coupled to RF input port 50 as explained earlier, together constitute a coaxial RF transmission line of the matching unit 310. Outer housing 22 terminates adjacent insulating flange 82 and is electrically and mechanically coupled to a conductive sleeve 94 by means of a ring clamp 96.

Conductive sleeve 94 extends outwardly over insulating flange 82 and is electrically coupled to mirror housing assembly 86 by means of a pair of ring clamps 98 held together with the mirror housing assembly 86 by screws 100.

Figure 6:
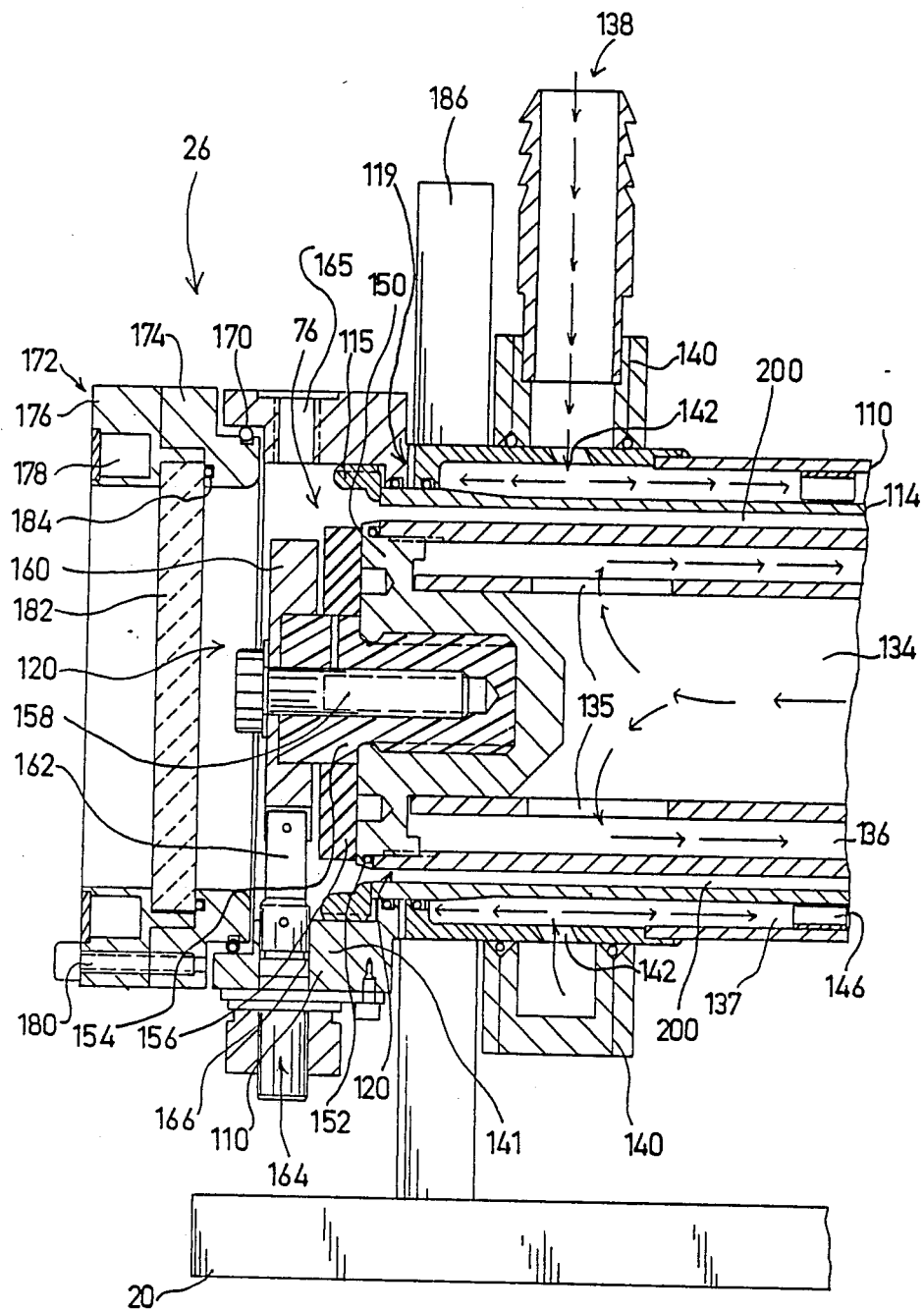
FIG. 6 is a scale side view sectional illustration of a portion of the laser of FIG. 1 including the output coupler end of the optical resonator.
Figures 8A, 8B:
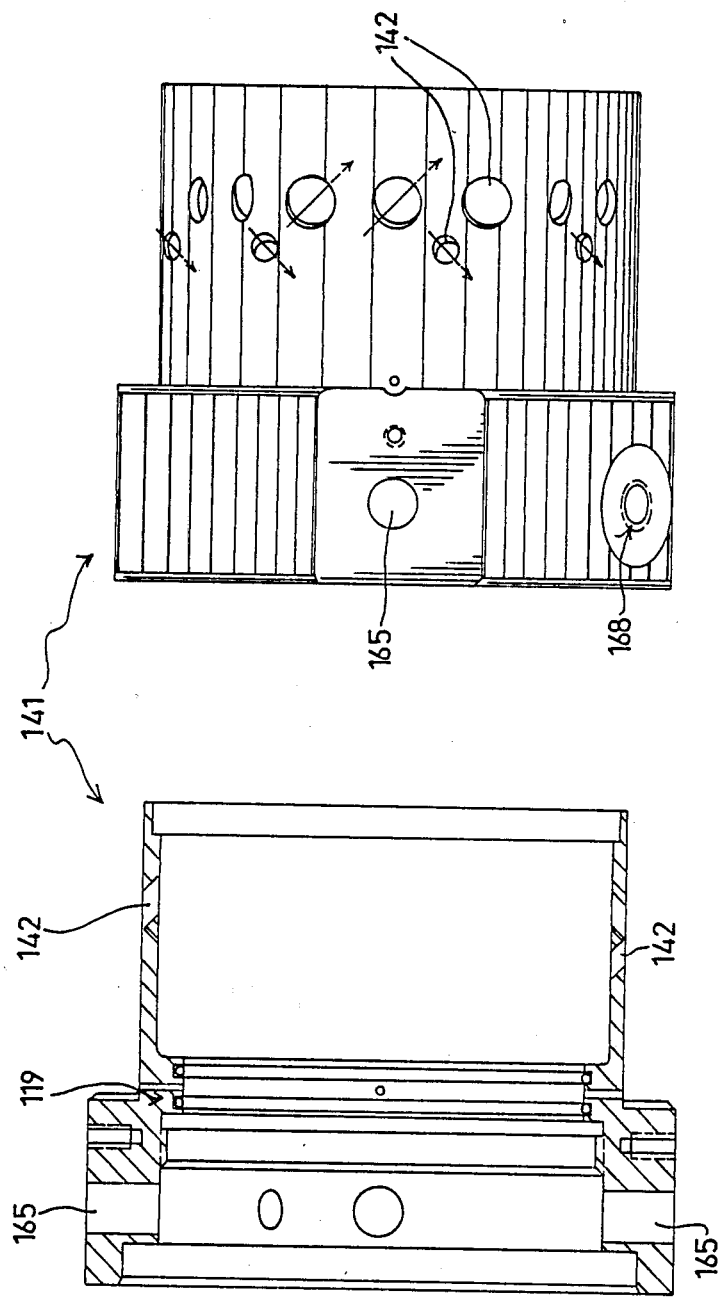
FIGS. 8A and 8B are respective outside side and inner sectional illustrations of a portion of the apparatus shown in FIG. 6.
Figure 9C:
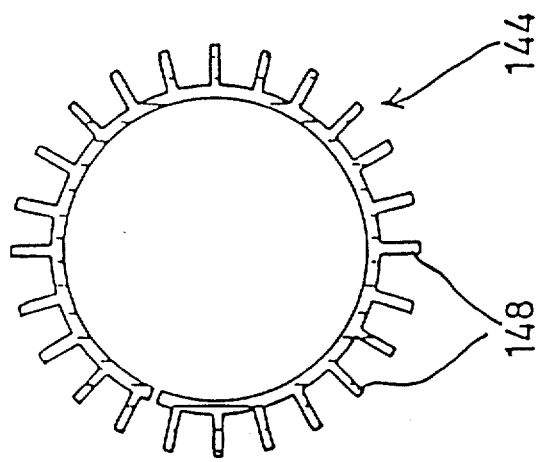
FIG. 9C is a sectional illustration of a fluid flow directing element associated with the internal electrode, illustrated in FIG. 5, taken along the lines C — C in FIG. 5.
Figure 9D:
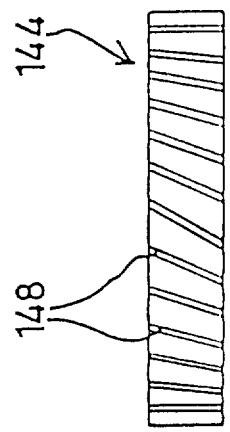
FIG. 9D is a side view illustration of the interior of the element of FIG. 9C.
Figure 9A:
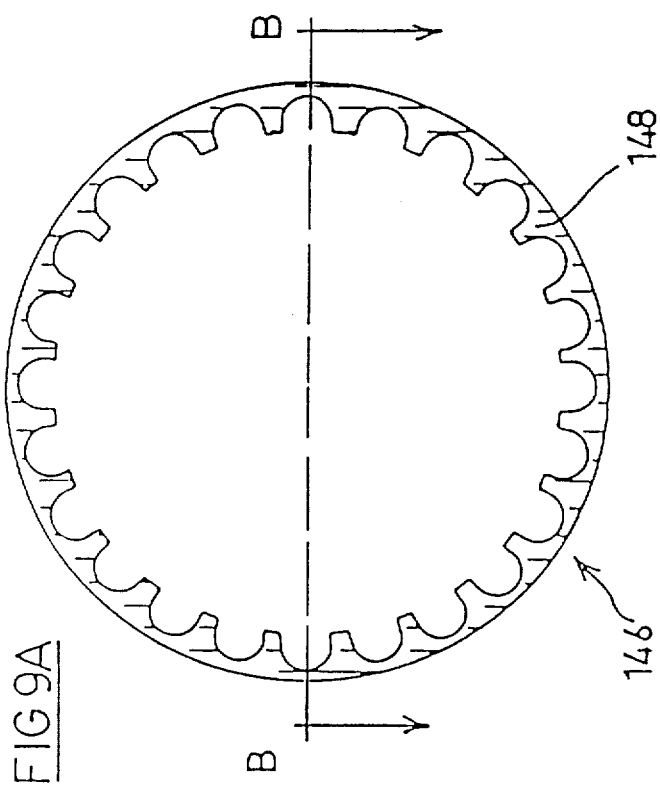
FIG. 9A is a sectional illustration of a fluid flow directing element associated with the outer electrode, illustrated in FIG. 5, taken along the lines A — A in FIG. 5.
Figure 9B:
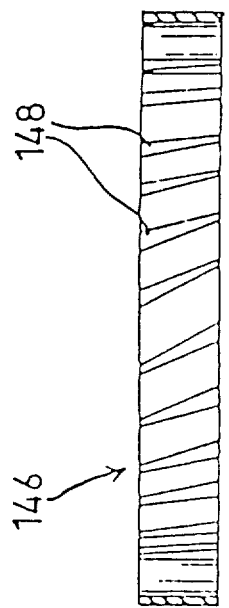
FIG. 9B is a side view illustration of the interior of the element of FIG. 9A, taken along the lines B — B in FIG. 9A.

An electrical conducting disk 102 provides good electrical contact between mirror housing assembly 86 and an outer housing element 110. Screws 106 cooperating with clamps 108 secure disk 102 in the desired conductive relationship. An outer electrode assembly 104 comprises outer housing element 110 in which are formed a plurality of gas ports 112, and an outer electrode element 114, which is secured to element 110 by a threaded ring 115 (FIG. 6) and sealed thereto by means of O-rings 116 and 118 and an identical O-ring assembly 119, (FIGS. 6 and 8B).

Figure 10:
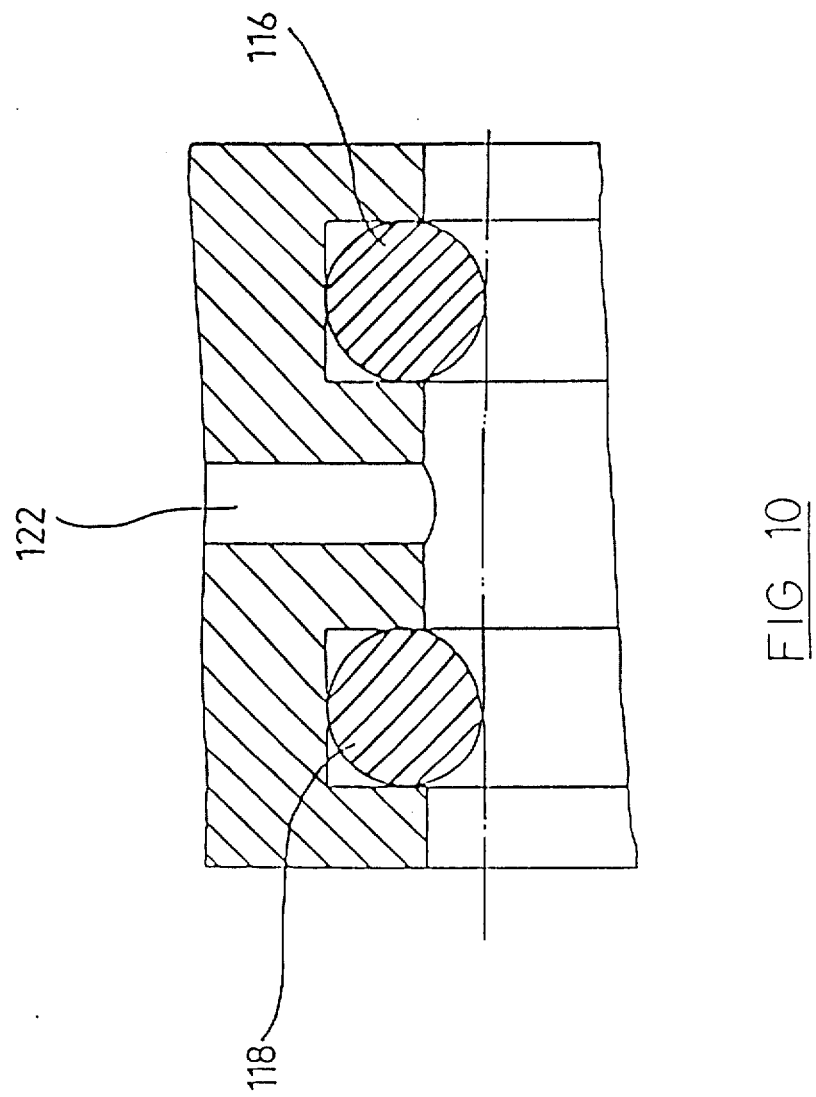
FIG. 10 is a sectional illustration of a sealing assembly for the outer electrode in the laser head, shown generally in FIGS. 1, 4, 6, and 8B.

As will be appreciated from FIGS. 4 and 10, O-ring 116 serves to seal a negative relative pressure volume 120 disposed between inner electrode 68 and outer electrode assembly 104 from the atmosphere which communicates via a plurality of apertures 122 disposed between O-rings 116 and 118.

O-ring 118 serves to seal a cooling fluid containing volume 124 disposed between outer electrode element 114 and outer housing element 110 from the atmosphere communicating through apertures 122.

An annular cooling fluid manifold 126 communicates with volume 124 via a plurality of cooling fluid apertures 128 formed in outer housing element 110. Manifold 126 communicates with a cooling fluid receptacle via an aperture and a conduit not shown.

Returning now to a consideration of inner electrode assembly 68, it is seen that axial fluid conduit 30 terminates in a connecting flange 130 onto which is mounted in coaxial, partially overlapping relationship with conduit 30, a further cooling fluid conduit 132, which extends towards end 26.

Figure 5:
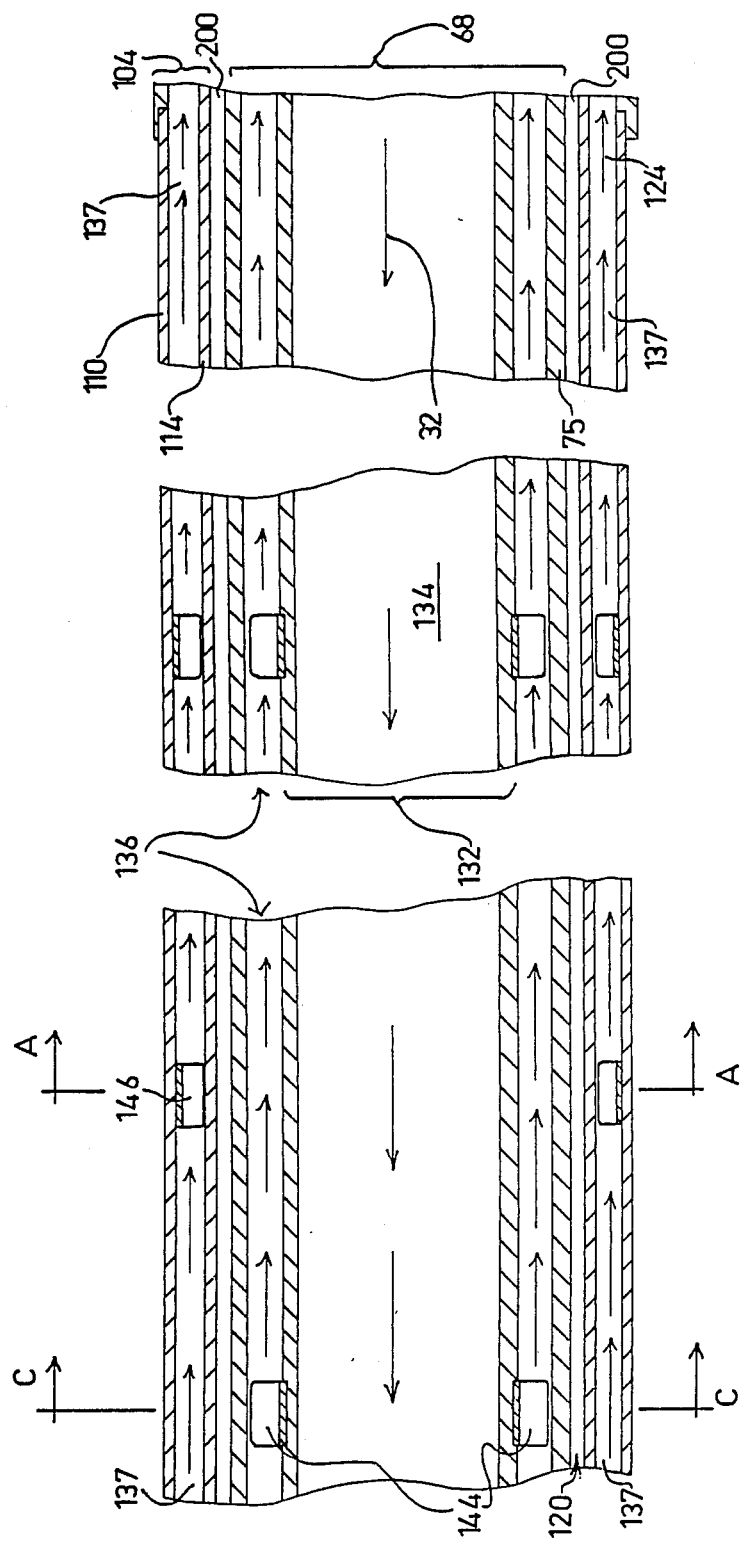
FIG. 5 is a scale side view sectional illustration of a portion of the laser of FIG. 1 including the coaxial electrodes in the optical cavity and the cooling conduits associated therewith.

Considering now the cooling of the inner electrode assembly 68, reference is made to FIGS. 5 and 6, in which the volume defined by conduit 132, flange 130 and conduit 30 (FIG. 4) is indicated by reference numeral 134. Cooling fluid from inlet 28 (FIG. 2) passes through volume 134 and returns via apertures 135 (FIG. 6) and a conduit defined initially between conduit 132 and concentric surrounding inner electrode portion 75 and thereafter between conduit 30 and concentric surrounding cylindrical portion 70 and conduit 34 (FIG. 4). This return conduit defines a volume 136. The returned cooling fluid exits volume 136 via outlet 36 (FIG. 2). Alternatively, the coolant flow path described hereinabove may be in an opposite direction, i.e. from an inlet 36 to an outlet 28 (FIG. 2).

It is seen that an additional cooling fluid pathway is defined in outer electrode assembly 104 via a volume 137 between outer housing element 110 and outer electrode element 114. Sealing of volumes 137 and 120 from the atmosphere is provided by an O-ring assembly 119, which is similar to that shown in FIG. 10 and described hereinabove. Cooling fluid passes from an inlet 138, via a manifold 140 and apertures 142 through annular pathway 137 to an outlet (not shown) communicating with manifold 126 (FIG. 4).

Reference is now made to FIGS. 8A and 8B, which illustrate a collar member 141, which forms the end of outer housing element 110 and in which are defined apertures 142. It is seen from FIGS. 8A and 8B that the cooling fluid passing inwardly through apertures 142 is directed in various directions, by the pitch of the apertures 142 in the finite thickness of the collar member 141. This results in uniform distribution of cooling fluid over the annular surface of volume 137 (FIGS. 5 and 6).

Referring now also to FIGS. 9A-9D, it is seen that there are distributed along the cooling fluid pathways defined by volumes 136 and 137 flow directing elements 144 and 146 respectively. Flow directing elements 144 and 146, as seen particularly in respective FIGS. 9D and 9B, include helically configured vanes 148 which cause the cooling fluid flowing axially therepast parallel to axis 32 to attain a circular component of motion, thus providing uniform heat dissipation by the cooling fluid in contact with the electrodes adjacent to the respective volumes. It is seen that flow directing element 144 has outwardly directed vanes, while flow directing element 146 has inwardly directed vanes, although this need not be the case.

Turning now once again to FIG. 6 and a consideration of end sealing and centering member 76, it is seen that this member comprises a sealing flange portion 150, which in cooperation with an O-ring 152 is operative to seal volumes 134 and 136 from negative relative pressure volume 120. Disposed radially inward of sealing flange portion 150 is a generally cylindrical electrical insulator 154 onto which is seated an electrical insulating ring 156.

Disposed interiorly of insulator 154 is a bolt 158 which secures a mounting end disc 160 in fixed supporting relationship with respect to end sealing and centering member 76. Mounting end disc 160 is formed with a plurality, typically four, of symmetrically distributed mounting vanes 162, each of which is mounted in tension onto collar member 141 of housing element 110 in outer electrode assembly 104, as by suitable bolts, nuts and springs, collectively indicated by reference numeral 164, via apertures 165. An O-ring 166 provides necessary sealing at outer electrode assembly 104.

According to an alternative embodiment of the invention, the electrode centering member 76 may be replaced by apparatus for mounting the inner electrode onto a mirror 182 which will be addressed in greater detail below.

Gas ports 168, which are similar to gas ports 112 (FIG. 4), are also defined in collar member 141 as seen in FIGS. 8A and 8B.

Sealingly mounted onto collar member 141 by means of a sealing ring 170 is a mirror mounting assembly 172 comprising a mounting flange 174 and a securing and cooling flange 176, which is provided with cooling fluid at a conduit 178 formed therein, whose inlet and outlet are not seen in the drawing. Securing and cooling flange 176 is secured onto mounting flange 174 by means of a plurality of screw fasteners 180.

Precisely positioned between flanges 174 and 176 is an output coupling mirror 182, typically formed of ZnSe coated on one side to provide partial reflection and coated on the other side with an anti-reflective coating. A sealing ring 184 serves to provide a seal between the outer atmosphere and negative pressure volume 120.

Mechanical and thermal stabilization of the relative positions of mirrors 78 (FIG. 4) and 182 (FIG. 6) is provided by a stabilization assembly seen in FIG. 1 which comprises a plurality of main rods 190, typically three in number, and formed of a material having a low coefficient of thermal expansion, such as Invar. Rods 190 extend between plate members 186 and 60. A plurality of secondary rods 192, typically three in number, and also typically formed of Invar, connect plate member 60 to adjacent mirror housing assembly 86. A further three secondary rods 192 connect plate member 186 to mounting flange 174. Alternatively, mechanical and thermal stabilization may be achieved by employing a housing 110 formed of Invar. In such a case rods 190 may be eliminated.

The operation of the laser described hereinabove in connection with FIGS. 1-6 and 8A-9D will now be summarized. A lasing medium is located in a discharge volume 200, forming part of volume 120, between electrodes 75 and 114. Electrodes 75 and 114 are typically formed entirely of bare metal, such as aluminum, or coated metal such as gold plated aluminum or brass. According to an alternative embodiment of the invention, electrodes 75 and 114 may be formed with an insulating coating facing the discharge volume. Such a construction is described, inter alia, in "Intermediate-pressure electrodeless discharges in rf and pulsed fields" by Yu P. Razier, Sov J. Plasma Phys. 5(2) March-April 1979 (English Version) American Institute of Physics pp. 232-237.

The lasing medium typically comprises a mixture of carbon dioxide, nitrogen and helium in a typical ratio of 20:20:60. Alternatively a ratio of 10:10:80 may be employed. Various additives, such as Xenon and water vapor may be added to the lasing medium mixture as suitable, in accordance with the teachings of the general literature on this subject, such as "Plasma chemistry of RF discharges in $CO_2$ laser gas mixtures, G. C. R. Williams and A. L. S. Smith, J. Phys. D: Appl. Phys. Vol 18, (1985) 335-346. and "Influence of xenon on sealed-off operation of rf-excited $CO_2$ waveguide lasers", D. He and D. R. Hall, J. Appl. Phys. Vol 56(3) 1 August 1984. Lasers constructed and operative in accordance with the foregoing emit at a wavelength of approximately 10.6 micrometers.

Alternatively, a lasing medium comprising carbon monoxide instead of carbon dioxide as the lasing species may be employed. Somewhat different mixtures are appropriate in such a case and the emission wavelength will change to approximately 5.5 micrometers.

It is a particular feature of the present invention that the maximum temperature of the lasing medium is efficiently limited by highly efficient cooling. Limitation of the temperature of the lasing medium is essential to efficient laser operation in order to enable a maximum amount of electrical energy to be converted to an infrared radiation output in the laser. The high efficiency of the cooling is provided in large part due to the provision of a relatively small gap between the electrodes 75 and 114 defining discharge volume 200.

The relationship between the maximum temperature of the lasing medium and the temperature of the wall of the laser cavity is determined by the thermal conductivity of the lasing medium and the dimensions of the gap between the electrodes 75 and 114 at discharge volume 200.

The approximate relationship is given by the following expression:

$$P(1 - e)/2 = \frac{K(T_2 - T_1)a}{(d/2)}$$

such that $(T_2 - T_1) = \frac{P d(1 - e)}{4Ka}$ where
P is the excitation power;
e is the lasing efficiency fraction;
K is a constant representing the thermal conductivity of the gas mixture;
$T_2$ is the maximum temperature at a location approximately equidistant between the electrodes;
$T_1$ is the temperature at the surface of the electrodes;
a is the mean value of the area of one of the two electrodes;
d/2 is the length over which the temperature difference is considered, where d is the gap between the two electrodes.

For example, if one considered a laser having a 6KW excitation power, the following values are obtained:
P equals 6,000 Watts
e equals 0.1
K equals $2.114 \times_2 10^{-3}$ Watt/cm -degree Kelvin
a equals 868.5 cm
d equals 0.25 cm The temperature difference $(T_2 - T_1)$ is equal to about 180 degrees Kelvin, which is an acceptable value for the lasing medium as indicated, for example, in "Temperature Rise and Radial Profiles in $CO_2$ lasers" A. J. Landerman and S. R. Byron, Journal of Applied Physics, Vol 42, No. 8, July, 1971, pp 3138-3144.

It may be appreciated from a consideration of the above calculations that the maintenance of a small gap less than 5 mm is important. It is particularly important when operating with a small gap in the range of less than 5 mm, that plasma can be sustained by application of an AC electrical field only if the frequency is in the RF range, as specified hereinbelow.

As the result of the efficient cooling provided in accordance with the present invention, the lasing medium may be maintained in either a slow flowing or stagnant condition in volume 120. The slow flowing condition typically involves a flow rate of 2 liters per minute under standard atmospheric temperature and pressure (STP). The lasing medium may be recirculated and passed back through the system with or without refreshing or recombination to maintain the desired mixture ratio, as described above.

As the result of the provision of a small gap, efficient cooling for the plasma therein and the annular configuration of the discharge volume a highly compact gas laser is achieved in accordance with the present invention.

RF power is supplied to the lasing medium via RF input port 50 (FIG. 3). The RF connections to the laser are illustrated in electrical equivalent diagram form in FIG. 7, to which reference is now additionally made. The diagram of FIG. 7 illustrates a typical RF matching network 300 and the equivalent circuit 302 of the laser discharge cavity 304 (FIG. 1).

RF matching network 300 is operative to match the RF power input at port 50 with a 50 ohm impedance in order to prevent power reflection at portion 50. RF matching network 300 is also operative to transform the voltage from a 50 ohm transmission line 306, such as a Type HJ5-50 manufactured by Andrew of Orland Park, Ill., U.S.A., coupled at port 50 to a voltage defined by the physical and operational characteristics of the laser discharge cavity 304 (FIG. 1), including the pressure of the lasing medium in discharge volume 200 and the dimensions of the gap between electrodes 75 and 114.

Considering now the matching network 300, it is seen that it comprises a variable capacitance 308, which includes capacitors 46 and variable capacitance 56 (FIG. 3) as well as the capacitance defined by the physical structure of the RF matching unit 310 illustrated in FIG. 1. Capacitance 308 can vary between about 150 and 400 picoFarad. The matching network 300 also includes parallel and series inductances 312 and 314, which are connected to capacitance 308 as illustrated in FIG. 7.

Inductances 312 and 314 are provided by the mechanical structure of RF matching unit 310 (FIG. 1). Inductance 314 provides most of the voltage transformation from the transmission line 306 to the laser discharge volume 200 (FIGS. 4, 5, 6) in cavity 304 (FIG. 1).

Alternatively, matching may be carried out upstream of RF input port 50 if the transmission line 306 has suitable impedance or if the transmission line is configured to have a length equal to one-half of the wavelength of the RF energy transmitted therealong.

It is a particular feature of the present invention that grounded shielding is provided by the outer housing elements 22 and 110, which are coupled to the shielding of the transmission line 306, thus providing shielding for the RF matching unit 310 as well as for the laser discharge cavity 304.

The electrical equivalent circuit 302 of the laser discharge cavity 304 is not embodied in discrete dedicated electrical components but rather results from the structure and geometry of the cavity 304 and the conductance and reactance of the lasing medium discharge. Circuit 302 includes a parallel resistance 316 and capacitance 320.

The optical resonator of the laser is defined between annular mirror 78 and partial mirror 182, which serves as an output coupler. Should at least one of mirrors 78 and 182 comprise a spherical mirror, the configuration of the optical resonator is defined by the radius of curvature of such mirror, the distance between the mirrors and the dimensions of the annular discharge volume 200. These in turn define the lasing radiation mode to provide an annular output beam which is not confined by the electrodes 75 and 114. A similar structure is described in "Off-Axis Paths in Spherical Mirror Interferometers" by D. Herriot, H. Kogelnik, and R. Kompfner, Applied Optics Vol 3, No. 4; April 1964 pp 523-526. The structure described in this article has a ray configuration which may be regarded as being the geometrical equivalent of the above described annular output beam.

If the gap defined between electrodes 75 and 114 is relatively small in relation to the length of these electrodes, or flat mirrors are employed as mirrors 78 and 182, the radiation may be confined therebetween, and as a result, the electrodes 75 and 114 define a waveguide confining the discharge volume 200. Doughnut-shaped mirrors may also be used in this application.

Excitation of the lasing medium under RF power provides population inversion in the medium for maintaining desired excitation states therein. For example, an RF input at 70 MHz provides excitation conditions which are optimal for an E/N parameter suitable for a preferred configuration wherein flat mirrors are employed, the electrode gap is equal to 2.5 mm, the length of the electrodes 75 and 114, i.e. the length of the discharge volume 200, is 460 mm, and the lasing medium pressure is about 60 torr for a 10:10:80 carbon dioxide, nitrogen, helium mixture as described above. The E/N parameter represents the ratio of electric field between electrodes 75 and 114 to the molecular number density, i.e. the number of molecules per unit volume.

A typical value of E/N is in the range of $1 \times 10^{-16} - 3 \times 10^{-16}$ volts-cm$^2$. For example, the excitation power for the above described configuration and physical conditions is about 6250 Watts. In this example, the output power will be 500 Watts, for an efficiency of 8%. In the above example flat mirrors are used and the reflectivity of the partial reflector is 85%. If Xenon is added to the lasing medium mixture up to a concentration of about 5%, all other conditions except excitation power being maintained the same as above, the efficiency will increase to 8.9% for an output power of 600 Watts and an input power of about 6700 Watts. Both of the above examples refer to a continuous wave mode of operation.

Alternative sets of parameters may be employed. Examples of parameters which may be varied include excitation frequency, lasing mixture, length and diameter of electrodes and the gap therebetween, and mode of operation. For example a gated mode of operation may be employed instead of the continuous wave mode of operation.

According to a preferred embodiment of the present invention, the RF frequency lies in a range between 1-400 MHz, and is preferably in the vicinity of 20-200 MHz. For these frequencies, the gap separation lies in a range between 1-5 mm and preferably is in the vicinity of 2-4.5 mm. These paramaters provide the desired features of the present invention including high cooling efficiency, a self-sustaining plasma and E/N in the desired range described above. The lasing medium composition and pressure is selected to correspond to the above parameters in a conventional manner.

We claim:

1. A gas laser system comprising:
    an annular optical cavity extending symmetrically about an optical axis and including electrode means comprising inner and outer coaxial electrodes extending along the optical cavity for producing a radial electric field transverse to said optical axis,
    a gaseous lasing medium in the optical cavity,
    RF power means for providing an RF power output to the optical cavity and producing a population inversion in the gaseous lasing medium, and
    means for limiting temperature difference within the gaseous lasing medium to about 180°K, said temperature difference limiting means comprising cooling means for providing direct coolant fluid contact with the inner and outer electrodes along substantially their entire lengths and a discharge gap less than approximately 5 mm defined by opposed conductive surfaces of the inner and outer electrodes, the lasing medium being disposed in said discharge gap.

2. A laser system according to claim 1 and wherein said RF power means comprised RF impedance matching means, and said inner and outer electrodes are arranged axially along the same axis as a coaxial transmission line forming part of the RF impedance matching means.

3. A laser system according to claim 2 and wherein the inner and outer electrodes are electrically connected to and fixedly attached to inner and outer conductor elements of said coaxial transmission line, respectively.

4. A laser system according to claim 3 and wherein the inner and outer electrodes are integrally formed together with said inner and outer conductor elements of the coaxial transmission line, respectively.

5. A laser system according to claim 1 and wherein said cooling means comprises an axial coolant fluid conduit extending through an aperture formed in optical element means defining at least one of the axial ends of the optical cavity.

6. A laser system according to claim 1 and also comprising optical elements disposed at opposite ends of said optical cavity, said optical elements defining an optical resonator.

7. A laser system according to claim 5 and also comprising optical elements disposed at opposite ends of said optical cavity, said optical elements defining an optical resonator.

8. A laser system according to claim 6 and wherein said optical elements and said discharge gap between said inner and outer electrodes are configured to cause laser radiation produced by the laser system to be confined by the inner and outer electrodes.

9. A laser system according to claim 6 and wherein said optical elements comprise a partially reflecting front mirror output coupler and a full reflecting rear mirror.

10. A laser system according to claim 6 and wherein said optical elements comprise first and second full reflectors, at least one of which includes infrared input and output window means, whereby said laser system provides infrared amplification.

11. A laser system according to claim 2 and wherein an inner conductor element of said coaxial transmission line constitutes part of a cooling fluid conduit means of said cooling means.

12. A laser system according to claim 11 and wherein said cooling fluid conduit means has boundary portions defined by respective inner surfaces of said inner electrode and said inner conductor element of said coaxial transmission line.

13. A laser system according to claim 2 and wherein said cooling means comprises inner fluid conduit means having an axis coincident with the axis of said inner and outer electrodes and outer fluid conduit surrounding said inner fluid conduit means and in communication therewith, said outer fluid conduit means having boundary portions defined by an inner surface of said inner electrode and an inner surface of an inner conductor element of said coaxial transmission line.

14. A laser system according to claim 13 and wherein said inner fluid conduit means has a coolant fluid inlet disposed toward one end of said RF impedance matching means and an outlet which opens to an inlet of said outer fluid conduit means, and said outer fluid conduit means has an outlet disposed toward said one end of said RF impedance matching means such that coolant fluid flows in opposite directions in the inner and outer conduit means, respectively.

15. A gas laser system comprising:
optical cavity means for contåining a gaseous lasing medium and including inner and outer electrodes disposed concentrically about an optical axis of said optical cavity means for electrically exciting the lasing medium, and
RF power means for transmitting RF power to said inner electrode and said outer electrode and including RF impedance matching means having a coaxial RF transmission line with an inner conductor element electrically connected to said inner electrode and an outer conductor element electrically connected to said outer electrode, said inner and outer conductor elements being coaxial with said inner and outer electrodes, respectively.

16. A laser system according to claim 15 and wherein said inner conductor element and said outer conductor element are fixedly attached to said inner electrode and said outer electrode, respectively.

17. A laser system according to claim 15 and further comprising cooling means for effecting direct coolant fluid contact with said inner and outer electrodes.

18. A laser system according to claim 17 and wherein said cooling means comprises first fluid conduit means extending along substantially the entire length of said inner electrode and second fluid conduit means extending along substantially the entire length of said outer electrode.

19. A laser system according to claim 18 and wherein said first fluid conduit means has boundary portions defined by an inner wall of said inner electrode and an inner wall of said inner conductor element of said coaxial transmission line, and said second fluid conduit means surrounds said outer electrode.

20. A laser system according to claim 19 and wherein said cooling means includes third fluid conduit means disposed within said first fluid conduit means and having a fluid outlet open to said first fluid conduit means, said third fluid conduit means and said first fluid conduit means together defining portions of an annular flow volume extending along substantially the entire length of said inner electrode and longitudinally within said coaxial transmission line.

21. A laser system according to claim 15 and wherein said outer conductor element of said coaxial transmission line comprises a conductive housing electrically connected to said outer electrode, and said inner conductor element of said coaxial transmission line comprises a conductive conduit electrically connected to said inner electrode and surrounded by said housing.

22. A laser system according to claim 21 and wherein said housing is grounded and said conduit is connected to an RF input port.

* * * * *

UNITED STATES PATENT AND TRADEMARK OFFICE
CERTIFICATE OF CORRECTION

PATENT NO. : 4,847,852

DATED : July 11, 1989

INVENTOR(S) : Shaul Yatsiv, Amnon Gabay, Mordechai Brestel, and Judd Blass, deceased It is certified that error appears in the above-identified patent and that said Letters Patent is hereby corrected as shown below:

IN THE DRAWINGS:

Sheet 1: Change "1 of 8" to --1 of 10--.
Sheet 2: Change "2 of 8" to --2 of 10--.
Sheet 3: Change "3 of 8" to --3 of 10--.
Sheet 4: Change "4 of 8" to --4 of 10--.
Sheet 5: Change "5 of 8" to --5 of 10--.
Sheet 6: Change "6 of 8" to --6 of 10--.
Sheet 7: Change "7 of 8" to --7 of 10--.
Sheet 8: Change "8 of 8" to --8 of 10--.

After Sheet 8: Insert Sheet 9 (Figs. 9A, 9B, 9C, and 9D) and Sheet 10 (Fig. 10) attached hereto.

IN THE SPECIFICATION:

Column 8, line 28, change "$2.114X_210^{-3}$" to --$2.114 \times 10^{-3}$--.
Column 8, line 29, change "868.5 cm" to --868.5 $cm^2$--.

UNITED STATES PATENT AND TRADEMARK OFFICE
CERTIFICATE OF CORRECTION

PATENT NO. : 4,847,852

DATED : July 11, 1989

INVENTOR(S) : Shaul Yatsiv, et al

It is certified that error appears in the above-identified patent and that said Letters Patent is hereby corrected as shown below:

Col. 9, line 1, change "portion" to --port--.

Col. 10, line 67, change "comprised" to --comprises--.

Signed and Sealed this

Seventeenth Day of July, 1990

*Attest:*

*Attesting Officer*

HARRY F. MANBECK, JR.

*Commissioner of Patents and Trademarks*